US012125448B2

(12) United States Patent
Nakahara

(10) Patent No.: US 12,125,448 B2
(45) Date of Patent: Oct. 22, 2024

(54) CIRCUIT DEVICE AND DISPLAY SYSTEM

(71) Applicant: SEIKO EPSON CORPORATION, Tokyo (JP)

(72) Inventor: Tatsunori Nakahara, Fujimi (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/359,134

(22) Filed: Jul. 26, 2023

(65) Prior Publication Data

US 2024/0046892 A1 Feb. 8, 2024

(30) Foreign Application Priority Data

Jul. 27, 2022 (JP) ................................ 2022-119285

(51) Int. Cl.
*G09G 3/34* (2006.01)

(52) U.S. Cl.
CPC ... *G09G 3/3426* (2013.01); *G09G 2320/0242* (2013.01); *G09G 2360/16* (2013.01)

(58) Field of Classification Search
CPC ......... G09G 2320/0242; G09G 3/3426; G09G 2360/16
See application file for complete search history.

(56) References Cited

U.S. PATENT DOCUMENTS 10,803,829 B2 * 10/2020 Harada ................ G09G 3/3413
10,976,605 B2 * 4/2021 Ji ...................... G02F 1/133606
11,120,758 B2 * 9/2021 Jo ........................ G09G 3/3413
11,763,758 B2 * 9/2023 Miyatani .............. G09G 3/3406 345/207
2014/0043350 A1 * 2/2014 Ikeda ...................... G09G 5/10 356/213
2015/0279286 A1 10/2015 Harada et al.
2018/0157121 A1 6/2018 Matsuura et al.
2021/0193066 A1 6/2021 Anand et al.
2021/0311361 A1 10/2021 Okamoto et al.
2022/0293060 A1 * 9/2022 Miyata .............. G02F 1/133606

FOREIGN PATENT DOCUMENTS

JP 2018-092082 A 6/2018
JP 2019-095559 A 6/2019
JP 2021-101199 A 7/2021

* cited by examiner

*Primary Examiner* — Doon Y Chow
(74) *Attorney, Agent, or Firm* — Harness, Dickey & Pierce, P.L.C.

(57) ABSTRACT

A circuit device includes a storage unit configured to store a plurality of lookup tables, and a luminance information calculation circuit configured to calculate luminance information indicating a luminance of light reaching a target pixel of a display panel from a backlight. The first lookup table is associated with a first light source element provided at a first position, and indicates a first attenuation rate distribution of the first light source element. The second lookup table is associated with a second light source element provided at a second position, and indicates a second attenuation rate distribution of the second light source element. The luminance information calculation circuit obtains a first attenuation rate of light reaching the target pixel from the first light source element based on the first lookup table, obtains a second attenuation rate of light reaching the target pixel from the second light source element based on the second lookup table, and calculates the luminance information based on the first attenuation rate and the second attenuation rate.

12 Claims, 13 Drawing Sheets

LUTA

| | | | u<0 | | | | | u>0 | | | |
|---|---|---|---|---|---|---|---|---|---|---|---|
| | | | $u^2$ | | | | | | | | |
| | | | 128 | 96 | 64 | 32 | 0 | 32 | 64 | 96 | 128 |
| v<0 | $v^2$ | 128 | 0 | 0 | 0 | 0 | 0.2 | 0 | 0 | 0 | 0 |
| | | 96 | 0 | 0 | 0 | 0.225 | 0.4 | 0.225 | 0 | 0 | 0 |
| | | 64 | 0 | 0 | 0.307 | 0.51 | 0.6 | 0.51 | 0.307 | 0 | 0 |
| | | 32 | 0 | 0.225 | 0.51 | 0.717 | 0.8 | 0.717 | 0.51 | 0.225 | 0 |
| | | 0 | 0.2 | 0.4 | 0.5 | 0.8 | 1 | 0.8 | 0.6 | 0.4 | 0.2 |
| v>0 | | 32 | 0 | 0.225 | 0.51 | 0.717 | 0.8 | 0.717 | 0.51 | 0.225 | 0 |
| | | 64 | 0 | 0 | 0.307 | 0.51 | 0.6 | 0.51 | 0.307 | 0 | 0 |
| | | 96 | 0 | 0 | 0 | 0.225 | 0.4 | 0.225 | 0 | 0 | 0 |
| | | 128 | 0 | 0 | 0 | 0 | 0.2 | 0 | 0 | 0 | 0 |

LUTB

| | | | u<0 | | | | | u>0 | | | |
|---|---|---|---|---|---|---|---|---|---|---|---|
| | | | u² | | | | | | | | |
| | | | 128 | 96 | 64 | 32 | 0 | 32 | 64 | 96 | 128 |
| v<0 | v² | 128 | 0 | 0 | 0 | 0 | 0.2 | 0 | 0 | 0 | 0 |
| | | 96 | 0 | 0 | 0 | 0.225 | 0.4 | 0.225 | 0 | 0 | 0 |
| | | 64 | 0 | 0 | 0.307 | 0.51 | 0.6 | 0.51 | 0.307 | 0 | 0 |
| | | 32 | 0 | 0.225 | 0.51 | 0.717 | 0.8 | 0.717 | 0.736 | 0 | 0 |
| | | 0 | 0.2 | 0.4 | 0.5 | 0.8 | 1 | 1 | 1 | 0 | 0 |
| v>0 | | 32 | 0 | 0.225 | 0.51 | 0.717 | 0.8 | 0.717 | 0.736 | 0 | 0 |
| | | 64 | 0 | 0 | 0.307 | 0.51 | 0.6 | 0.51 | 0.307 | 0 | 0 |
| | | 96 | 0 | 0 | 0 | 0.225 | 0.4 | 0.225 | 0 | 0 | 0 |
| | | 128 | 0 | 0 | 0 | 0 | 0.2 | 0 | 0 | 0 | 0 |

LUTC

| | | | u<0 | | | | | u>0 | | | |
|---|---|---|---|---|---|---|---|---|---|---|---|
| | | | $u^2$ | | | | | | | | |
| | | | 128 | 96 | 64 | 32 | 0 | 32 | 64 | 96 | 128 |
| v<0 | $v^2$ | 128 | 0 | 0 | 0 | 0 | 0.2 | 0 | 0 | 0 | 0 |
| | | 96 | 0 | 0 | 0 | 0.225 | 0.4 | 0.225 | 0 | 0 | 0 |
| | | 64 | 0 | 0 | 0.307 | 0.51 | 0.6 | 0.51 | 0.307 | 0 | 0 |
| | | 32 | 0 | 0 | 0.736 | 0.717 | 0.8 | 0.717 | 0.51 | 0.225 | 0 |
| | | 0 | 0 | 0 | 1 | 1 | 1 | 0.8 | 0.6 | 0.4 | 0.2 |
| v>0 | | 32 | 0 | 0 | 0.736 | 0.717 | 1 | 0.717 | 0.51 | 0.225 | 0 |
| | | 64 | 0 | 0 | 0.307 | 0.736 | 1 | 0.736 | 0.307 | 0 | 0 |
| | | 96 | 0 | 0 | 0 | 0 | 0 | 0 | 0 | 0 | 0 |
| | | 128 | 0 | 0 | 0 | 0 | 0 | 0 | 0 | 0 | 0 |

LUTA ua²  ub²

| | | | u<0 | | | | | | u>0 | | |
|---|---|---|---|---|---|---|---|---|---|---|---|
| | | | u² | | | | | | | | |
| | | | 128 | 96 | 64 | 32 | 0 | 32 | 64 | 96 | 128 |
| v<0 | v² | 128 | 0 | 0 | 0 | 0 | 0.2 | 0 | 0 | 0 | 0 |
| | | 96 | 0 | 0 | 0 | 0.225 | 0.4 | 0.225 | 0 | 0 | 0 |
| | | 64 | 0 | 0 | 0.307 | 0.51 | 0.6 | 0.51 | 0.307 | 0 | 0 |
| | | 32 | 0 | 0.225 | 0.51 | 0.717 | 0.8 | 0.717 | 0.51 | 0.225 | 0 |
| | | 0 | 0.2 | 0.4 | 0.5 | 0.8 | 1 | 0.8 | 0.6 | 0.4 | 0.2 |
| v>0 | | 32 | 0 | 0.225 | 0.51 | 0.717 | 0.8 | 0.717 | 0.51 | 0.225 | 0 |
| | | 64 | 0 | 0 | 0.307 | 0.51 | 0.6 | 0.51 | 0.307 | 0 | 0 |
| | | 96 | 0 | 0 | 0 | 0.225 | 0.4 | 0.225 | 0 | 0 | 0 |
| | | 128 | 0 | 0 | 0 | 0 | 0.2 | 0 | 0 | 0 | 0 |

va²  vb²

| | |
|---|---|
| Luava | Luavb |
| Lubva | Lubvb |

CIRCUIT DEVICE AND DISPLAY SYSTEM

The present application is based on, and claims priority from JP Application Serial Number 2022-119285, filed Jul. 27, 2022, the disclosure of which is hereby incorporated by reference herein in its entirety.

BACKGROUND

1. Technical Field

The present disclosure relates to a circuit device, a display system, and the like.

2. Related Art

JP-A-2019-095559 discloses an image display device that performs local dimming. The image display device includes an LED output value calculation unit, a display luminance data calculation unit, and an LDC data calculation unit. The LED output value calculation unit obtains emission luminance data indicating a luminance during light emission of a light source corresponding to each area of an image. The display luminance data calculation unit obtains diffusion luminance data by performing convolution processing using a previously prepared luminance diffusion function on the emission luminance data. A linear interpolation unit performs linear interpolation processing on the diffusion luminance data to obtain display luminance data which is data having a value for each pixel for each primary color. The LDC data calculation unit obtains a light transmittance of each pixel for each primary color based on input image data and the display luminance data, and outputs, as LCD data, data representing the light transmittance.

Since a plurality of light sources are arranged in a backlight and peripheral structures of the light sources are different according to positions of the light sources, diffusion patterns of light reaching a display panel from the light sources differ depending on a difference in the peripheral structures. When a luminance of the light reaching each pixel of the display panel from the backlight is obtained without considering such a difference in the diffusion patterns, there is a problem that the luminance cannot be obtained with high accuracy. Since color correction of image data is performed based on the luminance of the light reaching each pixel, when the luminance cannot be obtained with high accuracy, appropriate color correction cannot be performed. JP-A-2019-095559 neither discloses nor suggests to consider a difference in the diffusion patterns of the light according to the positions of the light sources when the luminance of the light reaching each pixel from the backlight is obtained.

SUMMARY

An aspect of the present disclosure relates to a circuit device including: a storage unit configured to store a plurality of lookup tables each indicating an attenuation rate distribution of a light source element of a backlight of a display device including a display panel and the backlight; and a luminance information calculation circuit configured to calculate luminance information indicating a luminance of light reaching a target pixel of the display panel from the backlight, in which the storage unit is configured to store, as the plurality of lookup tables, a first lookup table that is associated with a first light source element provided at a first position of the backlight and that indicates a first attenuation rate distribution of the first light source element, and a second lookup table that is associated with a second light source element provided at a second position different from the first position of the backlight and that indicates a second attenuation rate distribution of the second light source element, and the luminance information calculation circuit is configured to obtain a first attenuation rate of light reaching the target pixel from the first light source element based on the first lookup table, obtain a second attenuation rate of light reaching the target pixel from the second light source element based on the second lookup table, and calculate the luminance information based on the first attenuation rate and the second attenuation rate.

Another aspect of the present disclosure relates to a display system including the circuit device and the display device.

DESCRIPTION OF EMBODIMENTS

Hereinafter, a preferred embodiment according to the present disclosure will be described in detail. The embodiment to be described below does not unduly limit contents described in the claims, and not all configurations described in the present embodiment are necessarily essential constituent elements.

1. Electronic Device, Display System, and Circuit Device

Figure 1:
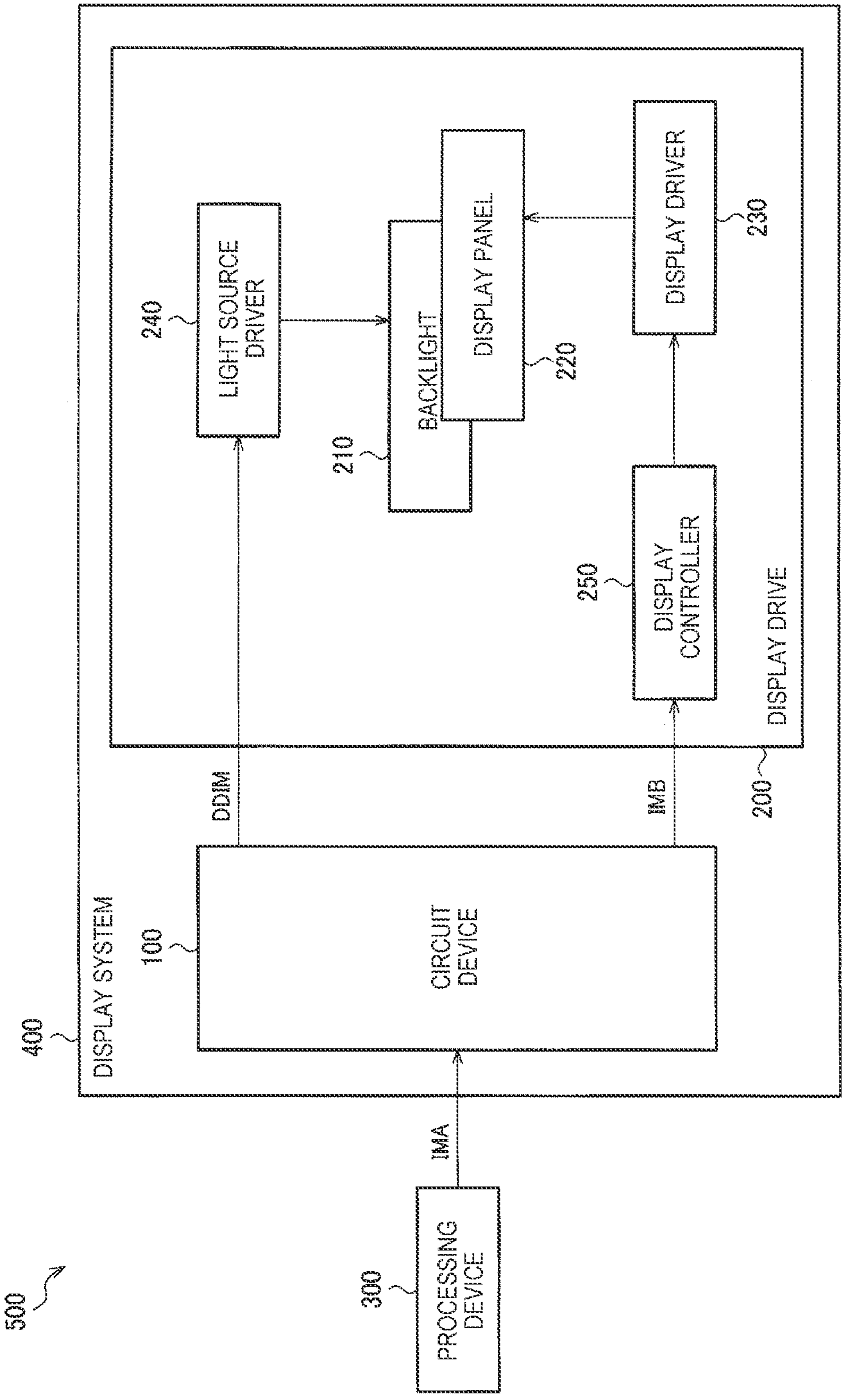
FIG. 1 is a configuration example of an electronic device including a display system according to an embodiment.

FIG. 1 is a configuration example of an electronic device including a display system according to an embodiment. An electronic device 500 includes a processing device 300 and a display system 400. The electronic device 500 is, for example, an in-vehicle cluster panel including a display, an in-vehicle display device including a head-up display and the like, a television device, or an information processing device including a display.

The display system 400 includes a circuit device 100 and a display device 200. The circuit device 100 is, for example, an integrated circuit device in which a plurality of circuit elements are integrated on a semiconductor substrate. Although FIG. 1 shows the circuit device 100 and the display device 200 as separate components, the circuit device 100 may be provided in the display device 200.

The display device 200 includes a backlight 210, a display panel 220, a display driver 230, a light source driver 240, and a display controller 250. An example of the display device 200 is a display used in the television device, the information processing device, and the like. Alternatively, the display device 200 may be a head mounted display including a projection device for eyes, a head-up display including a projection device for a screen, and the like. When the display device 200 is a head-up display, the display device 200 further includes an optical system for projecting, onto a screen, light emitted from the backlight 210 and transmitted through the display panel 220.

In a plan view with respect to the backlight 210, light source elements are two-dimensionally arranged in the backlight 210. The light source elements are light-emitting elements that emit light by power supply, and are, for example, inorganic light emitting diodes or organic light emitting diodes. In local dimming control, light amounts of the two-dimensionally arranged light source elements are controlled independently of each other. Alternatively, the backlight is divided into a plurality of areas each including a plurality of light source elements in a plan view. The light source elements provided in each area may be controlled to have the same light amount, and the light amounts of the areas may be controlled independently of each other.

An example of the two-dimensional arrangement of the light source elements is a square arrangement in which the light source elements are arranged at all intersections of a plurality of rows and a plurality of columns. However, the two-dimensional arrangement is not limited to the square arrangement. For example, the two-dimensional arrangement may be an arrangement called, for example, a rhomboid arrangement or a zigzag arrangement. In this arrangement, the light source elements are arranged at the intersections of the odd-numbered columns and one of the odd-numbered rows and the even-numbered rows, and at the intersections of the even-numbered columns and the other of the odd-numbered rows and the even-numbered rows, and the light source elements are not arranged at the other intersections.

The light source driver 240 receives dimming data DDIM from the circuit device 100, and drives each of the light source elements of the backlight 210 based on the dimming data DDIM. The light source driver 240 is, for example, an integrated circuit device. A plurality of light source drivers may be provided, and each of the light source drivers may be a separate integrated circuit device.

The display panel 220 is an electro-optical panel through which light is transmitted from the backlight 210, and displays an image by controlling a transmittance thereof. For example, the display panel 220 is a liquid crystal display panel.

The display controller 250 receives image data IMB from the circuit device 100, and transmits, to the display driver 230, the image data IMB and a timing control signal for controlling a display timing. The display controller 250 may perform image processing such as gradation correction, white balance correction, or enlargement and reduction on the received image data IMB.

The display driver 230 drives the display panel based on the received image data and the timing control signal to display an image on the display panel 220. The display controller 250 and the display driver 230 may be implemented with separate integrated circuit devices, or may be implemented with a one-piece integrated circuit device.

The processing device 300 transmits image data IMA to the circuit device 100. The processing device 300 is a processor such as a CPU, a microcomputer, a DSP, an ASIC, or an FPGA.

The circuit device 100 receives the image data IMA and performs the local dimming control of the display device 200 based on the image data IMA. The circuit device 100 determines, as dimming information, an emission luminance of each light source element or each area of the backlight 210 by performing luminance analysis on the image data IMA, and outputs the dimming data DDIM indicating the dimming information to the light source driver 240. The circuit device 100 performs color correction on the image data IMA based on the dimming information, and outputs the image data IMB after the color correction to the display controller 250.

Figure 2:
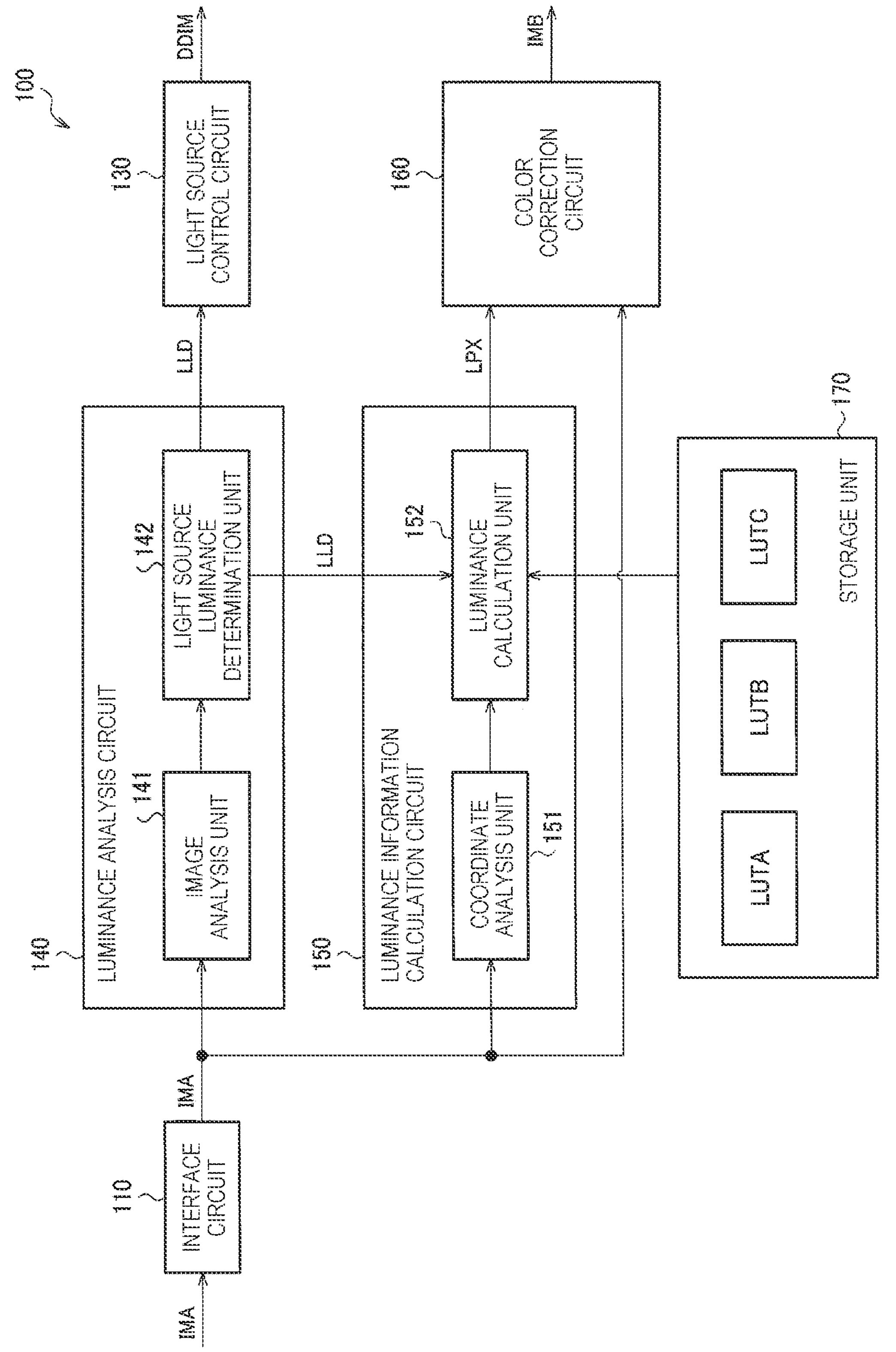
FIG. 2 is a detailed configuration example of a circuit device.

FIG. 2 is a detailed configuration example of the circuit device. The circuit device 100 includes an interface circuit 110, a light source control circuit 130, a luminance analysis circuit 140, a luminance information calculation circuit 150, a color correction circuit 160, and a storage unit 170. Hereinafter, a case in which light is independently adjusted for each light-emitting element of the backlight 210 in the local dimming will be described as an example, and light may be independently adjusted for each area including a plurality of light-emitting elements.

The interface circuit 110 receives the image data IMA from the processing device 300. The interface circuit 110 may be an interface circuit for various image interface systems such as an LVDS, a parallel RGB system, or a display port.

The luminance analysis circuit 140 includes an image analysis unit 141 and a light source luminance determination unit 142. The image analysis unit 141 analyzes a luminance of the image data IMB. The light source luminance determination unit 142 determines an emission luminance of each light-emitting element based on a result of the analysis obtained by the image analysis unit 141, and outputs, as dimming information, dimming data LLD indicating the emission luminance of each light-emitting element. For example, the image analysis unit 141 determines, in an image area corresponding to a light-emitting element of the backlight 210, a maximum luminance of pixel data belonging to the image area. The light source luminance determination unit 142 determines a minimum emission luminance within a range in which the maximum luminance can be displayed on the display device 200, and sets the minimum emission luminance as the emission luminance of the light-emitting element.

The light source control circuit 130 outputs the dimming data DDIM indicating the emission luminance of each light source element to the light source driver 240 based on the dimming data LLD indicating the emission luminance of the light source element. The light source driver 240 drives each light-emitting element with a PWM signal having a pulse width corresponding to the emission luminance of each light source element indicated by the dimming data DDIM. Accordingly, each light-emitting element emits light at the emission luminance controlled by the local dimming.

The storage unit 170 stores a lookup table indicating an attenuation rate distribution of light reaching the display panel from the light source element. FIG. 2 shows an example in which the storage unit 170 stores three types of lookup tables LUTA, LUTB, and LUTC having different attenuation rate distributions. However, the number of lookup tables may be two or more. The attenuation rate distribution indicates a relationship between a distance from a light source element to a pixel and an attenuation rate of light reaching the pixel from the light source element. The attenuation rate distribution is also called an attenuation characteristic or a luminance distribution. The storage unit 170 may be a register or a memory such as a RAM or a nonvolatile memory.

The luminance information calculation circuit 150 includes a coordinate analysis unit 151 and a luminance calculation unit 152. Details will be described later with reference to FIG. 3 and the subsequent drawings, and an outline thereof will be described here. The coordinate analysis unit 151 determines which of the lookup tables LUTA, LUTB, and LUTC is to be used, based on coordinates of the light source element. The luminance calculation unit 152 obtains, based on the lookup table determined by the coordinate analysis unit 151 and the dimming data LLD, luminance information indicating a luminance of light reaching each pixel of the display panel 220 from the light source element, and outputs the luminance information as an illumination luminance data LPX.

The color correction circuit 160 performs the color correction of the image data IMA based on the illumination luminance data LPX, and outputs the corrected image data IMB to the display driver 230. Specifically, the color correction circuit 160 multiplies the pixel data of each pixel by a reciprocal of the luminance of the light reaching the pixel, and sets the result as new pixel data of the pixel.

The light source control circuit 130, the luminance analysis circuit 140, the luminance information calculation circuit 150, and the color correction circuit 160 are logic circuits that process digital signals. Each of the light source control circuit 130, the luminance analysis circuit 140, the luminance information calculation circuit 150, and the color correction circuit 160 may be implemented with separate logic circuits, or a part or all of the above circuits may be implemented with an integrated logic circuit. Alternatively, a processor such as a DSP may execute an instruction set or a program in which functions of the light source control circuit 130, the luminance analysis circuit 140, the luminance information calculation circuit 150, and the color correction circuit 160 are described, and thus may implement the functions of these circuits.

The circuit device 100 may include a distortion correction circuit. The distortion correction circuit corrects image distortion caused by an optical system for projecting, onto a screen and the like, an image displayed on the display panel 220, or image distortion caused by distortion of the screen. Specifically, the distortion correction circuit performs image correction, on the image data IMA received by the interface circuit 110, to cancel or reduce the image distortion, and outputs the corrected image data to the luminance analysis circuit 140, the luminance information calculation circuit 150, and the color correction circuit 160. However, the distortion correction circuit may be provided not in the circuit device 100 but in the processing device 300.

2. Processing Flow of Luminance Information Calculation Circuit

Figure 3:
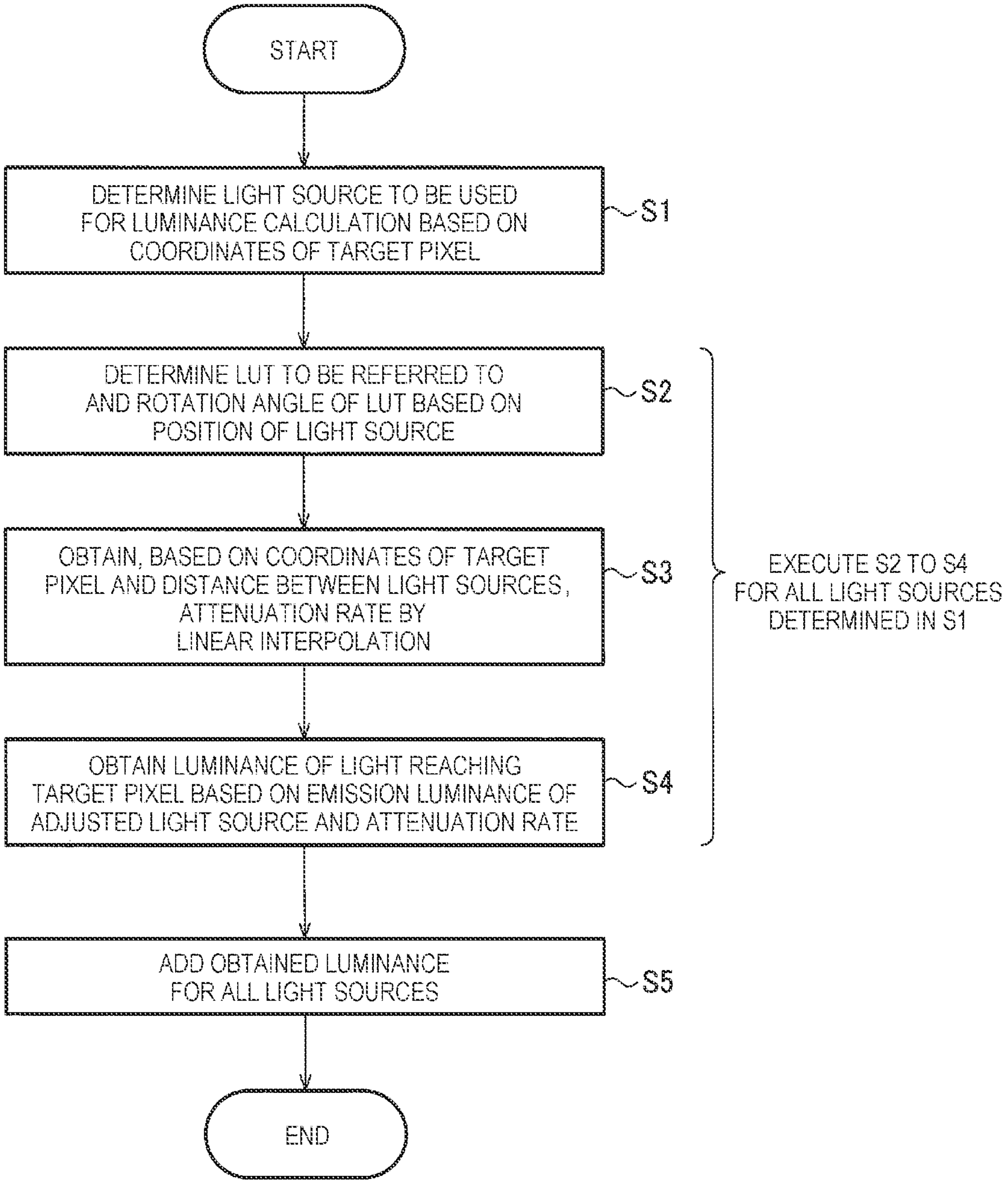
FIG. 3 is a flowchart of processing performed by a luminance information calculation circuit.

FIG. 3 is a flowchart of processing performed by a luminance information calculation circuit. In the following description, the target pixel is a pixel whose luminance information is to be obtained.

In step S1, the coordinate analysis unit 151 determines light source elements to be used for luminance calculation based on coordinates of the target pixel. For example, as will be described later with reference to FIG. 11, the coordinate analysis unit 151 determines a predetermined number of light source elements arranged around the target pixel as the light source elements to be used for luminance calculation.

In step S2, the coordinate analysis unit 151 determines, for each of the light source elements determined in step S1, a lookup table to be referred to and a rotation angle thereof based on a position of each light source element. For example, as will be described later with reference to FIGS. 4 to 10, the coordinate analysis unit 151 determines which of the lookup tables LUTA, LUTB, and LUTC is to be referred to and which of 0°, 90°, 180°, and 270° is to be set as the rotation angle.

In step S3, the luminance calculation unit 152 obtains, based on the coordinates of the target pixel and a distance between the light source elements, an attenuation rate by referring to the lookup table determined in step S2, and obtains an attenuation rate at the target pixel by linearly interpolating the attenuation rate. Specifically, as will be described later with reference to FIGS. 13 and 14, the luminance calculation unit 152 obtains four attenuation rates in the vicinity of the distance from the lookup table, and performs linear interpolation based on the four attenuation rates.

In step S4, the luminance calculation unit 152 obtains a luminance of light reaching the target pixel from the light source element based on the emission luminance of each light source element adjusted by the light source luminance determination unit 142 and the attenuation rate determined in step S3. Steps S2 to S4 are executed for all the light source elements determined in step S1.

In step S5, the luminance calculation unit 152 obtains a luminance of light reaching the target pixel from the backlight 210 by adding the luminance obtained in step S4 for all the determined light source elements. For example, a calculation example of the luminance will be described later in the following expression (1), and four terms are added to the right side of the expression (1). The calculation of each term corresponds to step S4, and the addition of the four terms corresponds to step S5.

3. Details of Step S2

Each step will be described in detail below. First, step S2 will be described in detail with reference to FIGS. 4 to 10.

Figure 4:
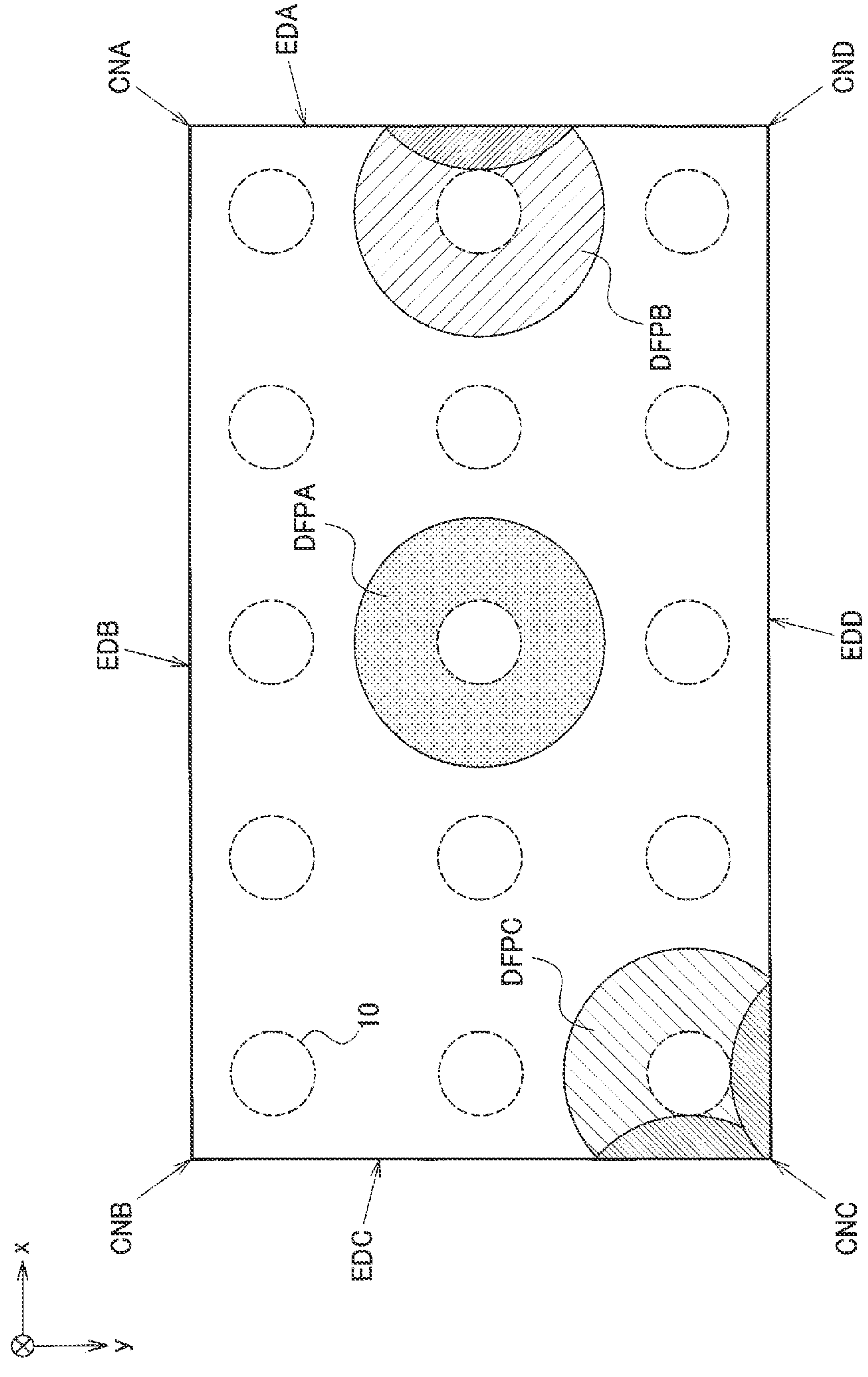
FIG. 4 is a diagram showing a difference in an attenuation rate distribution according to a position of a light source element.

FIG. 4 is a diagram showing a difference in an attenuation rate distribution according to a position of a light source element. FIG. 4 schematically shows the attenuation rate distribution such that a symmetry is mainly understood, and does not show an accurate attenuation rate distribution.

In FIG. 4, three directions orthogonal to one another are referred to as an x direction, a y direction, and a z direction. It is assumed that the backlight 210 and the display panel 220 are provided parallel to an xy plane, and the backlight 210 is provided on a z direction side of the display panel 220. The x direction is a horizontal direction of the display panel 220, and the y direction is a vertical direction of the display panel 220. Here, an example is shown in which a plurality of light source elements 10 are arranged in a square shape on the backlight 210.

EDA to EDD are four sides of the display panel 220. The side EDA and the side EDC face each other, and the side EDB and the side EDD face each other. The sides of the display panel 220 can also be referred to as sides of the backlight 210. CNA is a corner portion at which the side EDA and the side EDB intersect, CNB is a corner portion at which the side EDB and the side EDC intersect, CNC is a corner portion at which the side EDC and the side EDB intersect, and CND is a corner portion at which the side EDD and the side EDA intersect. The corner portions CNA to CND are also called corners or apexes. The corner portions of the display panel 220 can also be referred to as corner portions of the backlight 210.

An attenuation rate distribution DFPA of a light source element separated from the sides and the corner portions is an isotropic distribution. That is, the attenuation rate distribution DFPA is a distribution that is rotationally symmetric about the light source element, that is, a distribution in which an attenuation characteristic does not depend on a direction about the light source element. The expression "separated from the sides and the corner portions" means that the light source element is separated from the sides and the corner portions by at least one row or one column in the square arrangement.

An attenuation rate distribution DFPB of a light source element provided along the side EDA and separated from the corner portions CNA and CND is an anisotropic distribution. The side EDA is parallel to the y direction. In this case, the attenuation rate distribution DFPB is axisymmetric with respect to a straight line passing through a center of the attenuation rate distribution DFPB and parallel to the x direction, and is not axisymmetric with respect to a straight line passing through the center of the attenuation rate distribution DFPB and parallel to the y direction.

An attenuation rate distribution DFPC of a light source element provided in the corner portion CNC is an anisotropic distribution. The attenuation rate distribution DFPC is not axisymmetric with respect to the straight line passing through the center of the attenuation rate distribution DFPB and parallel to the x direction, and is not axisymmetric with respect to the straight line passing through the center of the attenuation rate distribution DFPB and parallel to the y direction.

Figure 5:
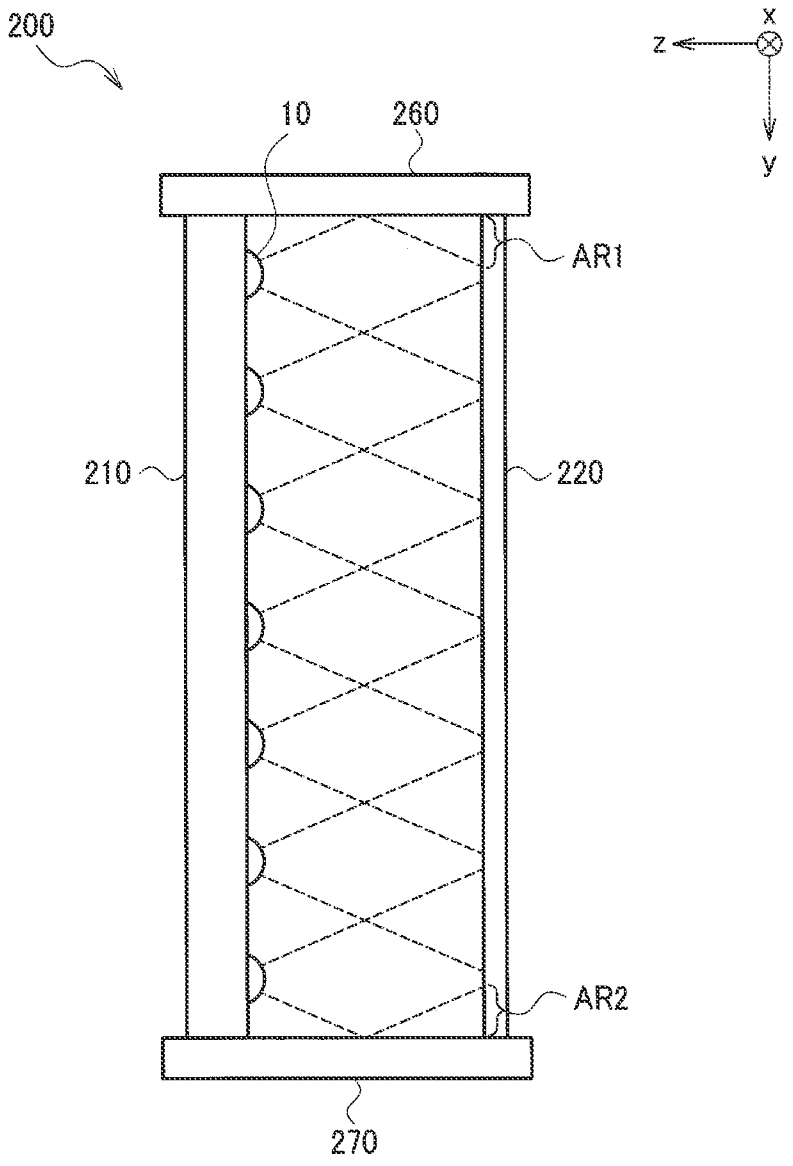
FIG. 5 is a diagram showing an anisotropic attenuation rate distribution.

FIG. 5 is a diagram showing an anisotropic attenuation rate distribution. The display device 200 includes a structure 270 provided around the backlight 210 and the display panel 220. The structure 270 is, for example, a light shielding member. The light shielding member houses the backlight 210 and the display panel 220, and shields light from the backlight 210 to the display panel 220 such that the light does not leak to the outside. A part of light emitted from the light source elements 10 close to the sides or the corner portions of the backlight 210 is reflected by the structure 270, and the reflected light reaches the display panel 220. In areas AR1 and AR2, direct light from the light source elements 10 and the reflected light from the structure 270 overlap each other, and thus a light amount increases as compared to a case in which no reflected light is present. Accordingly, an anisotropy of the attenuation rate distributions DFPB and DFPC in FIG. 4 occurs.

Figure 6:
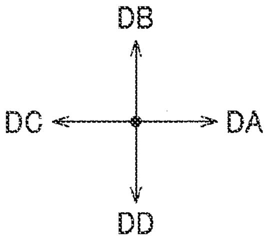
FIG. 6 is an example of a lookup table corresponding to a light source element separated from sides and corner portions.

FIG. 6 is an example of the lookup table LUTA corresponding to a light source element separated from the sides and the corner portions. u is a distance between a light source element in the x direction and the target pixel. v is a distance between a light source element in the y direction and the target pixel. Hereinafter, an example is shown in which an input of the lookup table is $u^2$ and $v^2$, and the input of the lookup table is not limited thereto. The input may be, for example, u and v.

u=v=0 is a center of the attenuation rate distribution. A direction DA in which u increases from the center corresponds to a direction from the center toward the side EDA. A direction DC in which u decreases from the center corresponds to a direction from the center toward the side EDC. A direction DD in which v increases from the center corresponds to a direction from the center toward the side EDD. A direction DB in which v decreases from the center corresponds to a direction from the center toward the side EDB. In the lookup table LUTA, attenuation characteristics are the same in the directions from the center toward all sides. That is, the attenuation rate distribution of the lookup table LUTA is rotationally symmetric with respect to the center thereof.

Figure 7:
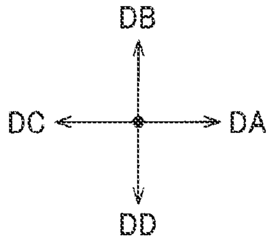
FIG. 7 is an example of a lookup table corresponding to a light source element provided along a side.

FIG. 7 is an example of the lookup table LUTB corresponding to a light source element provided along a side. In FIG. 7, a portion of the lookup table LUTB different from the LUTA is hatched.

In the lookup table LUTB, the attenuation characteristic in the direction DA from the center toward the side EDA is different from the attenuation characteristics in the directions DB, DC, and DD from the center toward the sides EDB, EDC, and EDD. The attenuation characteristics in the directions DB, DC, and DD from the center toward the sides EDB, EDC, and EDD are the same. That is, the attenuation rate distribution of the lookup table LUTB is non-rotationally symmetric with respect to the center thereof. The attenuation rate distribution of the lookup table LUTB is axisymmetric with respect to a straight line passing through the center and parallel to the direction DA, and is not axisymmetric with respect to a straight line passing through the center and parallel to the direction DD.

Figure 8:
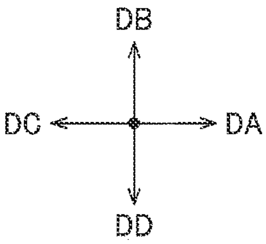
FIG. 8 is an example of a lookup table corresponding to a light source element provided at a corner portion.

FIG. 8 is an example of the lookup table LUTC corresponding to a light source element provided at a corner portion. In FIG. 8, a portion of the lookup table LUTC different from the LUTA is hatched.

In the lookup table LUTC, the attenuation characteristic in the direction DD from the center toward the side EDD is different from the attenuation characteristic in the direction DB from the center toward the side EDB, and the attenuation characteristic in the direction DC from the center toward the side EC is different from the attenuation characteristic in the direction DA from the center toward the side EDA. The attenuation characteristics in the directions DC and DD from the center toward the sides EDC and EDD are the same, and the attenuation characteristics in the directions DA and DB from the center toward the sides EDA and EDB are the same. That is, the attenuation rate distribution of the lookup table LUTC is non-rotationally symmetric with respect to the center thereof. The attenuation rate distribution of the lookup table LUTC is not axisymmetric with respect to a straight line passing through the center and parallel to the direction DC, and is not axisymmetric with respect to the straight line passing through the center and parallel to the direction DD.

Figure 9:
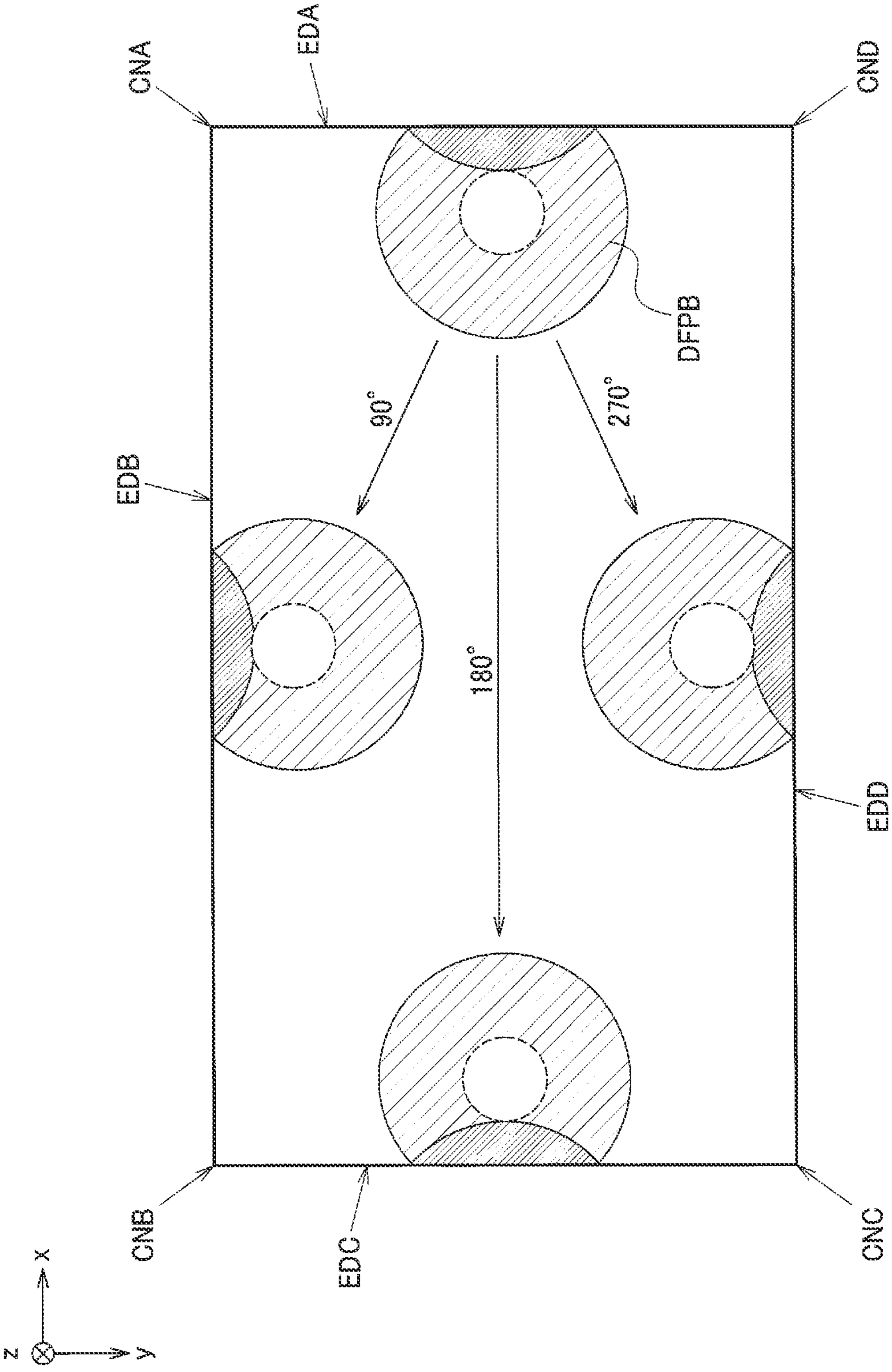
FIG. 9 is a diagram showing rotation of the lookup table corresponding to the light source element provided along the side.

FIG. 9 is a diagram showing rotation of the lookup table LUTB corresponding to the light source element provided along the side.

As shown in FIG. 9, the attenuation rate distributions of the light source elements arranged along the sides EDB, EDC, and EDD are obtained by rotating the attenuation rate distribution DFPB of the light source element provided along the side EDA in the counterclockwise direction by 90°, 180°, and 270°. The coordinate analysis unit 151 determines a reference lookup table and a rotation angle thereof as follows.

The coordinate analysis unit 151 determines the reference lookup table to the lookup table LUTB for the light source element provided along the side EDA, and determines the rotation angle to be 0°. Similarly, the coordinate analysis unit 151 determines the reference lookup table to the lookup table LUTB for the light source elements arranged along the sides EDB, EDC, and EDD, and determines the rotation angle to be 90°, 180°, and 270°. The luminance calculation unit 152 obtains the attenuation rate of the target pixel by referring to the reference lookup table obtained by rotating the lookup table LUTB in the counterclockwise direction by the rotation angles determined as described above.

Figure 10:
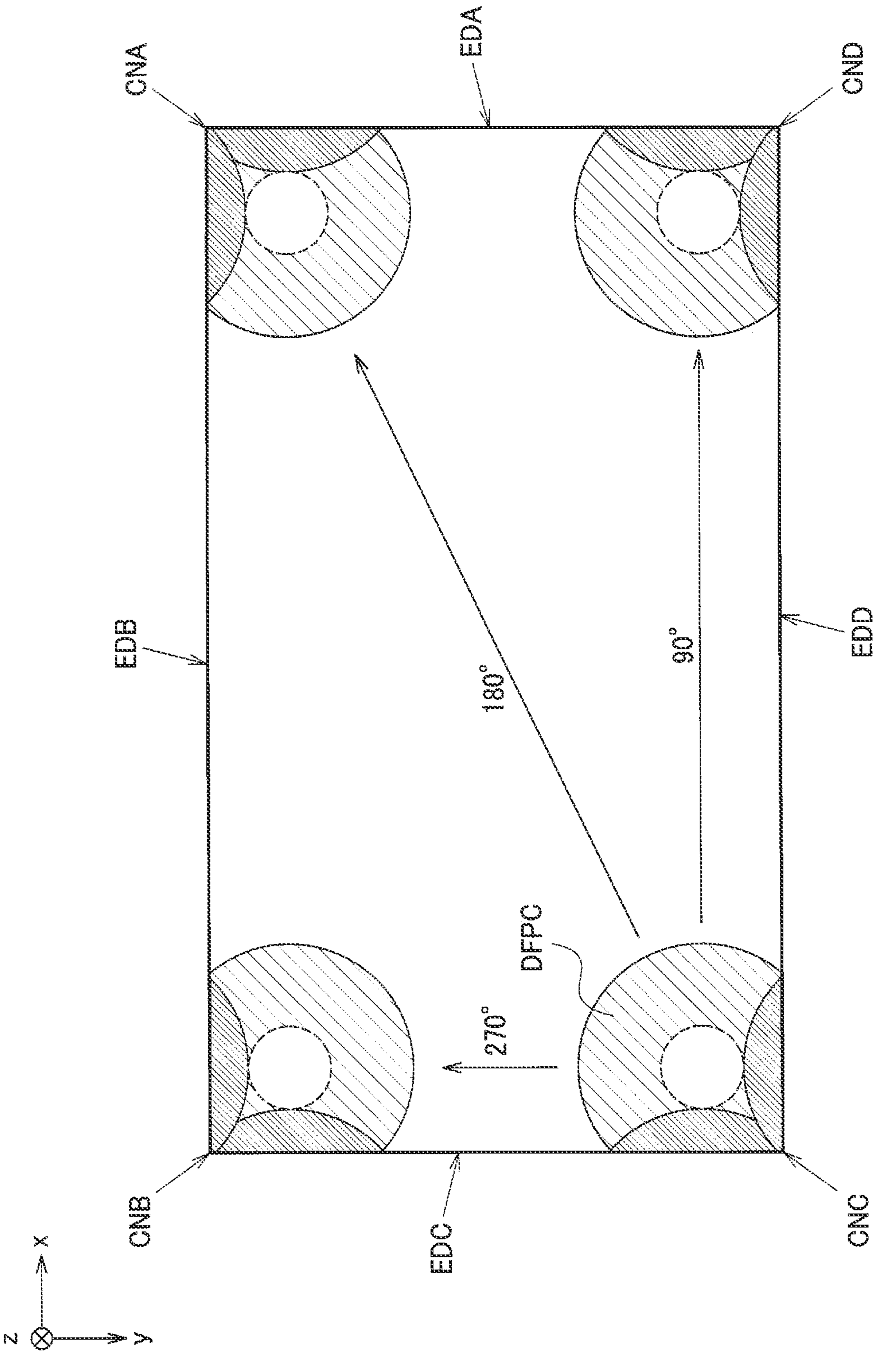
FIG. 10 is a diagram showing rotation of the lookup table corresponding to the light source element provided at the corner portion.

FIG. 10 is a diagram showing rotation of the lookup table LUTC corresponding to the light source element provided at the corner portion.

As shown in FIG. 10, the attenuation rate distributions of the light source elements arranged at the corner portions CND, CNA, and CNB are obtained by rotating the attenuation rate distribution DFPC of the light source element provided at the corner portion CNC in the counterclockwise direction by 90°, 180°, and 270°. Accordingly, the coordinate analysis unit 151 determines a reference lookup table and a rotation angle thereof as follows.

The coordinate analysis unit 151 determines the reference lookup table to the lookup table LUTC for the light source element provided at the corner portion CNC, and determines the rotation angle to be 0°. Similarly, the coordinate analysis unit 151 determines the reference lookup table to the lookup table LUTC for the light source elements arranged at the corner portions CND, CNA, and CNB, and determines the rotation angle to be 90°, 180°, and 270°. The luminance calculation unit 152 obtains the attenuation rate of the target pixel by referring to the reference lookup table obtained by rotating the lookup table LUTC in the counterclockwise direction by the rotation angles determined as described above.

Although the lookup table is rotated in the counterclockwise direction in FIGS. 9 and 10, the lookup table may be rotated in the clockwise direction. The rotation angles of 0°, 90°, 180°, and 270° in the clockwise direction correspond to the rotation angles of 0°, 270°, 180°, and 90° in the counterclockwise direction, respectively.

In the present embodiment described above, the circuit device 100 includes the storage unit 170 that stores a plurality of lookup tables, and the luminance information calculation circuit 150 that calculates luminance information indicating a luminance of light reaching the target pixel of the display panel 220 from the backlight 210. Each lookup table of the plurality of lookup tables indicates the attenuation rate distribution of the light source element of the backlight 210 of the display device 200 including the display panel 220 and the backlight 210. The storage unit 170 stores a first lookup table and a second lookup table. The first lookup table is associated with a first light source element provided at a first position of the backlight 210, and indicates a first attenuation rate distribution of the first light source element. The second lookup table is associated with a second light source element provided at a second position different from the first position of the backlight 210, and indicates a second attenuation rate distribution of the second light source element. The luminance information calculation circuit 150 obtains a first attenuation rate of light reaching the target pixel from the first light source element based on the first lookup table, and obtains a second attenuation rate of light reaching the target pixel from the second light source element based on the second lookup table. The luminance information calculation circuit 150 calculates luminance information based on the first attenuation rate and the second attenuation rate.

Here, the first lookup table may be any lookup table among the lookup tables LUTA, LUTB, and LUTC. Here, the second lookup table may be any lookup table different from the first lookup table among the lookup tables LUTA, LUTB, and LUTC.

According to the present embodiment, the first lookup table is associated with the first light source element provided at the first position, and the second lookup table is associated with the second light source element provided at the second position different from the first position. Accordingly, since a lookup table having a different attenuation rate distribution according to a position of a light source element can be applied, a luminance of light reaching each pixel from the backlight can be accurately obtained in consideration of the difference in a diffusion pattern of the light according to the position of the light source element. Since the luminance of the light reaching each pixel from the backlight is accurately obtained, the color of the image data can be appropriately corrected.

In the present embodiment, each lookup table is a table in which an attenuation rate at a distance, from the light source element to the pixel of the display panel 220, is associated with the distance. The luminance information calculation circuit 150 obtains the first attenuation rate at a distance from the first light source element to the target pixel based on the first lookup table. The luminance information calculation circuit 150 obtains the second attenuation rate at a distance from the second light source element to the target pixel based on the second lookup table.

In the examples in FIGS. 6 to 8, the distance from the light source element to the target pixel is the square of the distance u in the horizontal direction and the square of the distance v in the vertical direction, and the distance is not limited thereto. For example, the distance from the light source element to the target pixel may be the distance u in the horizontal direction and the distance v in the vertical direction, or may be a linear distance from the light source element to the target pixel and an angle formed by a straight line of the linear distance and a reference direction. The reference direction is, for example, the x direction or the y direction.

According to the present embodiment, the first attenuation rate at the distance from the first light source element to the target pixel is obtained based on the first lookup table, and the second attenuation rate at the distance from the second light source element to the target pixel is obtained based on the second lookup table. Accordingly, the attenuation rate at the distance from the light source element to the target pixel can be obtained based on the lookup table having a different attenuation rate distribution according to the position of the light source element.

In the present embodiment, the second position is a position that is closer to a first side of the display panel 220 than is the first position.

Here, the first position is a position of a light source element separated from the sides and the corner portions and corresponding to the attenuation rate distribution DFPA in FIG. 4. Here, the second position is a position of a light source element provided along a side and separated from the corner portions, and the second position corresponds to the attenuation rate distribution DFPB in FIG. 4. That is, the first lookup table is LUTA, and the second lookup table is LUTB. The first side is the side EDA in FIG. 4, but is not limited thereto, and may be any one of the four sides of the display panel 220.

As described with reference to FIG. 5, since the attenuation rate distribution of the light source element provided at a position close to the side of the display panel 220 is affected by the reflected light from the structure 270 provided around the display panel 220, the attenuation rate distribution is different from an attenuation rate distribution of a light source element provided at a position far from the side of the display panel 220. According to the present embodiment, the luminance of the light reaching each pixel from the backlight can be accurately obtained in consideration of such a difference in the attenuation rate distribution.

In the present embodiment, the backlight 210 includes a third light source element. The third light source element is provided at a third position that is closer to a third side facing the first side of the display panel 220 than is the first position. The luminance information calculation circuit 150 calculates a third attenuation rate of light reaching the target pixel from the third light source element based on a lookup table obtained by rotating the second lookup table by 180°. The luminance information calculation circuit 150 calculates luminance information based on the first attenuation rate, the second attenuation rate, and the third attenuation rate.

Here, the third side is the side EDC facing the side EDA in FIGS. 4 and 9. Here, the third position is a position of the light source element arranged along the side EDC and separated from the corner portions at both ends of the side EDC. As described with reference to FIG. 9, by rotating the lookup table LUTB of the light source element provided along the side EDA by 180°, a lookup table of the light source element provided along the side EDC can be obtained.

According to the present embodiment, a lookup table of a light source element provided near one side is stored in the storage unit 170, and by rotating the lookup table, lookup tables of light source elements arranged near the other three sides can be generated. Accordingly, a storage capacity of the storage unit 170 can be saved. However, for each of the four sides, the lookup table of the light source element provided near the side may be stored in the storage unit 170.

In the present embodiment, the second position may be a position that is closer to a first corner portion, at which the first side and a second side of the display panel 220 intersect with each other, than is the first position.

Here, the first position is a position of a light source element separated from the sides and the corner portions and corresponding to the attenuation rate distribution DFPA in FIG. 4. Here, the first side is the side EDC, the second side is the side EDD, and the second position is a position of a light source element provided at the corner portion CNC and corresponding to the attenuation rate distribution DFPC in FIG. 4. That is, the first lookup table is LUTA, and the second lookup table is LUTC. The first corner portion is the corner portion CNC in FIG. 4, but is not limited thereto, and may be any one of the four corner portions of the display panel 220.

As described with reference to FIG. 5, since the attenuation rate distribution of the light source element provided at a position close to the corner portion of the display panel 220 is affected by the reflected light from the structure 270 provided around the display panel 220, the attenuation rate distribution is different from an attenuation rate distribution of a light source element provided at a position far from the corner portion of the display panel 220. According to the present embodiment, the luminance of the light reaching each pixel from the backlight can be accurately obtained in consideration of such a difference in the attenuation rate distribution.

In the present embodiment, the backlight 210 includes the third light source element. The third light source element is provided at a position that is closer to a second corner portion, at which the third side facing the first side of the display panel 220 and a fourth side facing the second side intersect with each other, than is the first position. The luminance information calculation circuit 150 calculates the third attenuation rate of the light reaching the target pixel from the third light source element based on the lookup table obtained by rotating the second lookup table by 180°. The luminance information calculation circuit 150 calculates the luminance information based on the first attenuation rate, the second attenuation rate, and the third attenuation rate.

Here, the third side is the side EDA facing the side EDC in FIGS. 4 and 10, the fourth side is the side EDB facing the side EDD, and the third position is a position of a light source element provided at the corner portion CNA. As described with reference to FIG. 10, by rotating the lookup table LUTC of the light source element provided at the corner portion CNC by 180°, a lookup table of the light source element provided at the corner portion CNA is obtained.

According to the present embodiment, a lookup table of a light source element provided near one corner portion is stored in the storage unit 170, and by rotating the lookup table, lookup tables of light source elements arranged near the other three corner portions can be generated. Accordingly, the storage capacity of the storage unit 170 can be saved. However, for each of the four corner portions, the lookup table of the light source element provided near the corner portion may be stored in the storage unit 170.

In the present embodiment, the first attenuation rate distribution is an attenuation rate distribution that is rotationally symmetric with respect to a center thereof. The second attenuation rate distribution is an attenuation rate distribution that is non-rotationally symmetric with respect to a center thereof.

Here, the first attenuation rate distribution corresponds to the attenuation rate distribution DFPA in FIG. 4. Here, the second attenuation rate distribution may be any attenuation rate distribution among the attenuation rate distributions DFPB and DFPC in FIG. 4.

An attenuation rate distribution of a light source element provided at a position far from the sides or the corner portions of the display panel 220 is less likely to be affected by the reflected light from the structure 270 provided around the backlight 210 or the display panel 220. Therefore, the attenuation rate distribution of the light source can be a rotationally symmetric attenuation rate distribution or can be approximated by a rotationally symmetric attenuation rate distribution. On the other hand, an attenuation rate distribution of a light source element provided at a position close to a side or a corner portion of the display panel 220 is affected by the reflected light from the structure 270 provided around the display panel 220. Therefore, the attenuation rate distribution of the light source can be a non-rotationally symmetric attenuation rate distribution or can be approximated by a non-rotationally symmetric attenuation rate distribution.

In the present embodiment, in the second attenuation rate distribution, an attenuation characteristic in a direction from the center toward one side of the display panel 220 and an attenuation characteristic in a direction from the center toward a side different from the one side of the display panel 220 are different from each other.

For example, when the second attenuation rate distribution is the attenuation rate distribution DFPB in FIG. 4, the "one side" is the side EDA, and the "side different from the one side" is any side among the sides EDB, EDC, and EDD. Alternatively, when the second attenuation rate distribution is the attenuation rate distribution DFPC in FIG. 4, the "one side" is any side between the sides EDC and EDD, and the "side different from the one side" is any side between the sides EDA and EDB.

The reflected light from the structure 270 provided around the backlight 210 or the display panel 220 affects an area near a side in the attenuation rate distribution. Therefore, an attenuation characteristic in a direction toward a side that is not affected by the reflected light from the structure 270 is different from an attenuation characteristic in a direction toward a side that is affected by the reflected light from the structure 270.

In the present embodiment, the storage unit 170 stores a third lookup table. The third lookup table is associated with the third light source element provided at the third position different from the first position and the second position of the backlight 210, and indicates a third attenuation rate distribution of the third light source element. The second position is a position that is closer to a first side of the display panel 220 than is the first position. The third position is a position that is closer to the first corner portion, at which the second side and the third side of the display panel intersect with each other, than is the first position. The luminance information calculation circuit 150 obtains the third attenuation rate of the light reaching the target pixel from the third light source element based on the third lookup table, and calculates the luminance information based on the first attenuation rate, the second attenuation rate, and the third attenuation rate.

Here, the first position is a position of a light source element separated from the sides and the corner portions and corresponding to the attenuation rate distribution DFPA in FIG. 4. Here, the second position is a position of a light source element provided along a side and separated from the corner portions, and the second position corresponds to the attenuation rate distribution DFPB in FIG. 4. Here, the third position is a position of a light source element provided at the corner portion CNC and corresponding to the attenuation rate distribution DFPC in FIG. 4. The first side, the second side, and the third side correspond to the sides EDA, EDC, and EDD, respectively, and the first corner portion corresponds to the corner portion CNC. Alternatively, the first side may be any side among the sides EDA to EDD, and the first corner portion may be any corner portion among the corner portions CNA to CND.

According to the present embodiment, the first to third lookup tables are associated with the first to third light source elements provided at the different first to third positions. Accordingly, since a lookup table having a different attenuation rate distribution according to a position of a light source element can be applied, a luminance of light reaching each pixel from the backlight can be accurately obtained in consideration of the difference in a diffusion pattern of the light according to the position of the light source element.

In the present embodiment, the circuit device 100 includes the luminance analysis circuit 140 and the color correction circuit 160. The luminance analysis circuit 140 performs luminance analysis on the image data IMA, and obtains dimming information in the local dimming control based on the result of the luminance analysis. The luminance information calculation circuit 150 obtains a first luminance of the light reaching the target pixel from the first light source element based on the dimming information and the first attenuation rate, and obtains a second luminance of the light reaching the target pixel from the second light source element based on the dimming information and the second attenuation rate. The luminance information calculation circuit 150 calculates luminance information indicating the luminance of the light reaching the target pixel from the backlight 210 based on the first luminance and the second luminance. The color correction circuit 160 performs color correction on the image data of the target pixel based on the luminance information, and outputs the image data IMB after the color correction to the display device 200.

According to the present embodiment, in consideration of the difference in the diffusion pattern of the light according to the position of the light source element, the first luminance of the light reaching the target pixel from the first light source element and the second luminance of the light reaching the target pixel from the second light source element are accurately obtained. Accordingly, since the luminance information indicating the luminance of the light reaching the target pixel from the backlight 210 is accurately obtained, the color correction circuit 160 can appropriately correct the color of the image data of the target pixel based on the luminance information.

4. Details of Steps S1, S4, and S5

Figure 11:
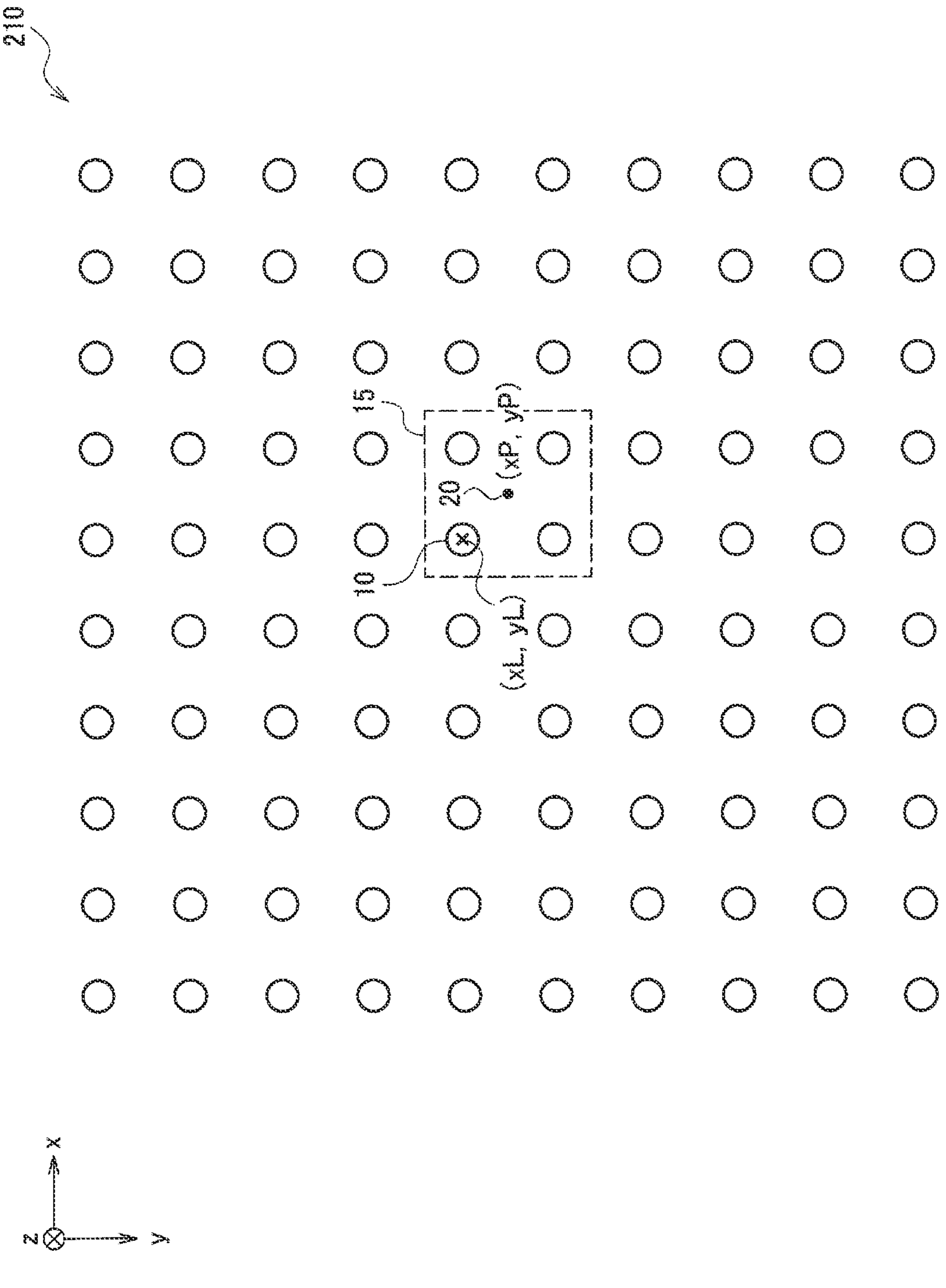
FIG. 11 is a diagram showing a method for determining a light source element used for luminance calculation.

Details of steps S1, S4, and S5 will be described with reference to FIGS. 11 and 12. FIG. 11 is a diagram showing a method for determining a light source element used for luminance calculation.

A pixel for which the luminance information calculation circuit 150 is to obtain the luminance information is set as a target pixel 20, and xy coordinates thereof are set as (xP, yP). The luminance information calculation circuit 150 obtains luminance information of each pixel of the display panel 220 by obtaining luminance information while sequentially shifting the target pixels 20.

xy coordinates of the light source element 10 are represented by (xL, yL). In a plan view of the display panel 220 and the backlight 210 in the z direction, the coordinates on the display panel 220 corresponding to a reference point of each light source element are (xL, yL). The reference point is, for example, a center of the light source element or a point of the highest luminance in a plan view.

The coordinate analysis unit 151 selects a plurality of light source elements 10 arranged around the target pixel 20. The plurality of selected light source elements 10 are referred to as a light source element group 15. FIG. 11 shows an example in which four light source elements around the target pixel 20 are selected. However, any number of the light source elements arranged around the target pixel 20 may be selected, or all the light source elements of the backlight 210 may be selected.

Figure 12:
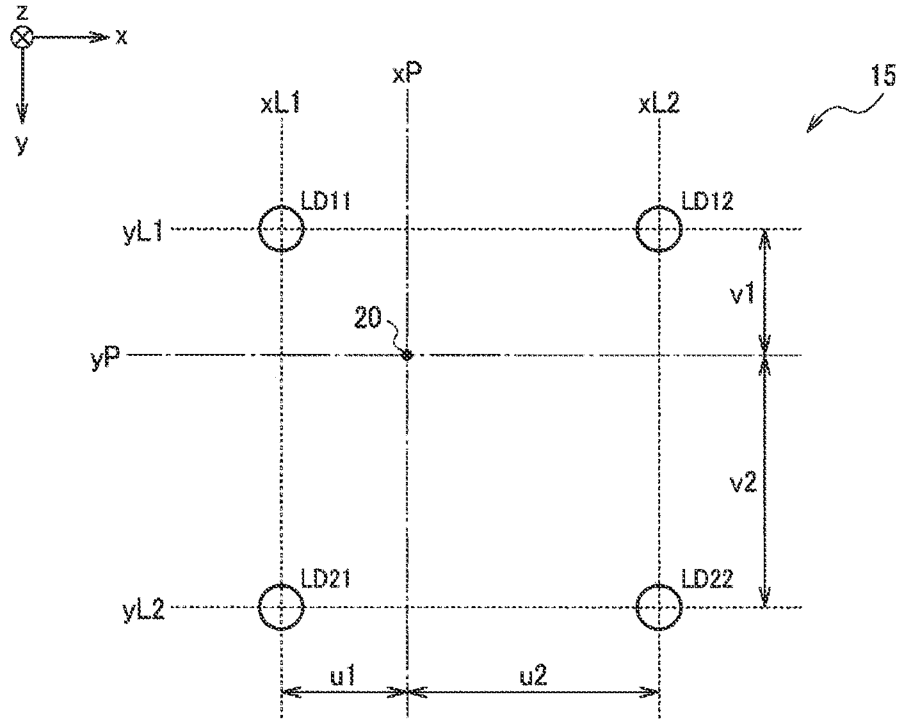
FIG. 12 is a diagram showing a distance between a target pixel and each light source element of a light source element group.

FIG. 12 is a diagram showing a distance between a target pixel and each light source element of a light source element group. Among 2×2 light source elements belonging to the light source element group 15, the i-th row and j-th column light source element is represented by LDij. The xy coordinates of the light source element LDij are represented by (xLj, yLi). i and j are integers of 1 or more and 2 or less.

The distance is a distance on the xy plane or on the display panel 220. The distance may be an actual distance such as a meter, or may be a distance defined in a predetermined unit. For example, when the predetermined unit is a pixel pitch of the display panel 220, the distance is indicated by the number of pixels on the display panel 220.

The coordinate analysis unit 151 obtains distances u1 and u2 between the light source element and the target pixel 20 in the x direction and distances v1 and v2 between the light source element and the target pixel 20 in the y direction. uj is a distance between the j-th column light source element and the target pixel 20 in the horizontal direction. Specifically, uj=xLj−xP. vi is a distance between the i-th row light source element and the target pixel 20 in the vertical direction. Specifically, vi=yLi−yP.

The luminance calculation unit 152 calculates, by the following formula (1), a luminance PIX_BL of light reaching the target pixel 20 from the plurality of light source elements belonging to the light source element group 15. LED_BLij is an emission luminance of the light source element LDij determined by the light source luminance determination unit 142. LUT_LDij ($uj^2$, $vi^2$) is an attenuation rate of light reaching the target pixel 20 from the light source element LDij, and is an attenuation rate calculated by the linear interpolation in step S3.

Math 1

$$\begin{aligned}\text{PIX\_BL} = &\ \text{LED\_BL11} \times \text{LUT\_LD11}(u1^2, v1^2) + \\ &\ \text{LED\_BL12} \times \text{LUT\_LD12}(u2^2, v1^2) + \\ &\ \text{LED\_BL21} \times \text{LUT\_LD21}(u1^2, v2^2) + \\ &\ \text{LED\_BL22} \times \text{LUT\_LD22}(u2^2, v2^2)\end{aligned} \tag{1}$$

5. Details of Step S3

Figure 13:
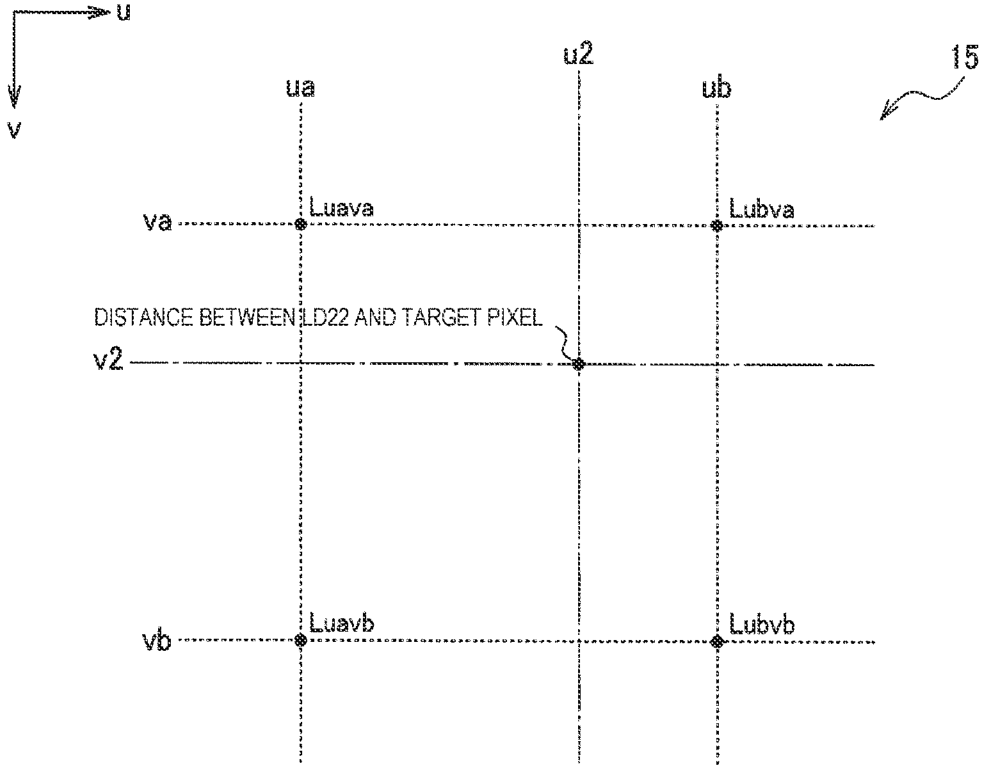
FIG. 13 is a diagram showing a calculation method for linear interpolation.

Details of step S3 will be described with reference to FIGS. 13 and 14. FIG. 13 is a diagram showing a calculation method for linear interpolation. Here, a luminance of light reaching the target pixel 20 from a light source element LD22 will be described as an example, and luminances of light reaching the target pixel 20 from light source elements LD11, LD12, and LD21 are also the same. Hereinafter, a case in which the distance in the x direction is u and the distance in the y direction is v will be described as (u, v).

A distance between the light source element LD22 and the target pixel 20 is (u2, v2). The luminance calculation unit 152 selects four most recent points (ua, va), (ub, va), (ua, vb), (ub, vb) including (u2, v2) among discrete distances used in a lookup table, and obtains attenuation rates Luava, lubva, Luavb, and lubvb. The luminance calculation unit 152 performs linear interpolation in the horizontal direction by the following formula (2), and performs linear interpolation in the vertical direction by the following formula (3) using the result. The result of the linear interpolation is an attenuation rate LUT_LD22 ($u2^2$, $v2^2$) of the light reaching the target pixel 20 from the light source element LD22.

Math 2

$$Lu2va = \frac{u2^2 - ua^2}{ub^2 - ua^2} \times (Lubva - Luava) + Luava, \qquad Lu2vb = \frac{u2^2 - ua^2}{ub^2 - ua^2} \times (Lubvb - Luavb) + Luavb \tag{2}$$

Math 3

$$Lu2v2 = \frac{v2^2 - va^2}{vb^2 - va^2} \times (Lu2vb - Lu2va) + Lu2va = \text{LUT\_LD22}(u2^2, v2^2) \tag{3}$$

In the above formula (2), a denominator is $ub^2-ua^2$ in a fractional part of the first term on the right side. When n is an integer equal to or greater than 1, by using a distance such that $ub^2-ua^2=2^n$ in the lookup table, the calculation of the fractional part is bit shift in an LSB direction, and a calculation load is reduced. For example, in the lookup tables in FIG. 6 to FIGS. 8, $u^2$=0, 32, 64, 96, and 128 are used, and $ub^2-ua^2=32=2^5$. The same applies to a fractional part of the first term on the middle side in the above formula (3).

Figure 14:
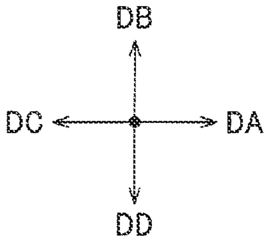
FIG. 14 is a diagram showing a specific calculation example of the linear interpolation.

FIG. 14 is a diagram showing a specific calculation example of the linear interpolation. Here, an example in which the lookup table LUTA is applied to the light source element LD22 and (u2, v2)=(5, 7) will be described.

In (u2, v2)=(5, 7), u2>0, v2>0 and ($u2^2$, $v2^2$)=(25, 49). In the lookup table LUTA, four points including this point are ($ua^2$, $va^2$)=(0, 32), ($ub^2$, $va^2$)=(32, 32), ($ua^2$, $vb^2$)=(0, 64), and ($ub^2$, $vb^2$)=(32, 64) at u>0, and v>0. The attenuation rates at these points are Luava=0.8, Lubva=0.717, Luavb=0.6, and Lubvb=0.51. By substituting these numerical values into the above formulas (2) and (3), the calculation of the linear interpolation is represented by the following formula (4).

Math 4

$$\begin{aligned}Lu2va &= \frac{25-0}{32-0} \times (0.717 - 0.8) + 0.8 = 0.735, \\ Lu2vb &= \frac{25-0}{32-0} \times (0.51 - 0.6) + 0.6 = 0.530, \\ Lu2v2 &= \frac{49-32}{64-32} \times (0.530 - 0.735) + 0.735 = 0.626\end{aligned} \tag{4}$$

The circuit device according to the present embodiment described above includes a storage unit that stores a plurality of lookup tables and a luminance information calculation circuit that calculates luminance information. Each lookup table of the plurality of lookup tables indicates an attenuation rate distribution of a light source element of a backlight of a display device including a display panel and the backlight. The luminance information indicates a luminance of light reaching a target pixel of the display panel from the backlight. The storage unit stores a first lookup table and a second lookup table as the plurality of lookup tables. The first lookup table is associated with a first light source element provided at a first position of the backlight, and indicates a first attenuation rate distribution of the first light source element. The second lookup table is associated with a second light source element provided at a second position different from the first position of the backlight, and indicates a second attenuation rate distribution of the second light source element. The luminance information calculation circuit obtains a first attenuation rate of light reaching the target pixel from the first light source element based on the first lookup table, and obtains a second attenuation rate of light reaching the target pixel from the second light source element based on the second lookup table. The luminance information calculation circuit calculates the luminance information based on the first attenuation rate and the second attenuation rate.

According to the present embodiment, the first lookup table is associated with the first light source element provided at the first position, and the second lookup table is associated with the second light source element provided at the second position different from the first position. Accordingly, since a lookup table having a different attenuation rate distribution according to a position of a light source element can be applied, a luminance of light reaching each pixel from the backlight can be accurately obtained in consideration of the difference in a diffusion pattern of the light according to the position of the light source element. Since the luminance of the light reaching each pixel from the backlight is accurately obtained, a color of image data can be appropriately corrected.

In the present embodiment, each lookup table may be a table in which an attenuation rate at a distance, from the light source element to the pixel of the display panel, is associated with the distance. The luminance information calculation circuit may obtain the first attenuation rate at a distance from the first light source element to the target pixel based on the first lookup table. The luminance information calculation circuit may obtain the second attenuation rate at a distance from the second light source element to the target pixel based on the second lookup table.

According to the present embodiment, the first attenuation rate at the distance from the first light source element to the target pixel is obtained based on the first lookup table, and the second attenuation rate at the distance from the second light source element to the target pixel is obtained based on the second lookup table. Accordingly, the attenuation rate at the distance from the light source element to the target pixel can be obtained based on the lookup table having a different attenuation rate distribution according to the position of the light source element.

In the present embodiment, the second position may be a position that is closer to a first side of the display panel than is the first position.

Since an attenuation rate distribution of a light source element provided at a position close to a side of the display panel is affected by reflected light from a structure arranged around the display panel, the attenuation rate distribution is different from an attenuation rate distribution of a light source element provided at a position far from the side of the display panel. According to the present embodiment, the luminance of the light reaching each pixel from the backlight can be accurately obtained in consideration of such a difference in the attenuation rate distribution.

In the present embodiment, the backlight may include a third light source element provided at a third position that is closer to a third side facing the first side of the display panel than is the first position. The luminance information calculation circuit may calculate a third attenuation rate of light reaching the target pixel from the third light source element based on a lookup table obtained by rotating the second lookup table by 180°. The luminance information calculation circuit may calculate the luminance information based on the first attenuation rate, the second attenuation rate, and the third attenuation rate.

According to the present embodiment, a lookup table of a light source element provided near one side is stored in the storage unit, and by rotating the lookup table, lookup tables of light source elements arranged near the other three sides can be generated. Accordingly, a storage capacity of the storage unit can be saved.

In the present embodiment, the second position may be a position that is closer to a first corner portion, at which the first side and a second side of the display panel intersect with each other, than is the first position.

Since an attenuation rate distribution of a light source element provided at a position close to a corner portion of the display panel is affected by the reflected light from the structure provided around the display panel, the attenuation rate distribution is different from an attenuation rate distribution of a light source element arranged at a position far from the corner portion of the display panel. According to the present embodiment, the luminance of the light reaching each pixel from the backlight can be accurately obtained in consideration of such a difference in the attenuation rate distribution.

In the present embodiment, the backlight may include the third light source element. The third light source element may be provided at a third position that is closer to a second corner portion, at which a third side facing the first side of the display panel and a fourth side facing the second side intersect with each other, than is the first position. The luminance information calculation circuit may calculate a third attenuation rate of light reaching the target pixel from the third light source element based on a lookup table obtained by rotating the second lookup table by 180°. The luminance information calculation circuit may calculate the luminance information based on the first attenuation rate, the second attenuation rate, and the third attenuation rate.

According to the present embodiment, a lookup table of a light source element provided near one corner portion is stored in the storage unit, and by rotating the lookup table, lookup tables of light source elements arranged near the other three corner portions can be generated. Accordingly, a storage capacity of the storage unit can be saved.

In the present embodiment, the first attenuation rate distribution may be an attenuation rate distribution that is rotationally symmetric with respect to a center thereof. The second attenuation rate distribution may be an attenuation rate distribution that is non-rotationally symmetric with respect to a center thereof.

An attenuation rate distribution of a light source element provided at a position far from the sides or the corner portions of the display panel is less likely to be affected by the reflected light from the structure provided around the backlight or the display panel. Therefore, the attenuation rate distribution of the light source can be a rotationally symmetric attenuation rate distribution or can be approximated by a rotationally symmetric attenuation rate distribution. On the other hand, an attenuation rate distribution of a light source element provided at a position close to a side or a corner portion of the display panel is affected by the reflected light from the structure provided around the display panel. Therefore, the attenuation rate distribution of the light source can be a non-rotationally symmetric attenuation rate distribution or can be approximated by a non-rotationally symmetric attenuation rate distribution.

In the present embodiment, in the second attenuation rate distribution, an attenuation characteristic in a direction from the center toward one side of the display panel and an attenuation characteristic in a direction from the center toward a side different from the one side of the display panel may be different from each other.

The reflected light from the structure provided around the backlight or the display panel affects an area near a side in the attenuation rate distribution. Therefore, an attenuation characteristic in a direction toward a side that is not affected by the reflected light from the structure is different from an attenuation characteristic in a direction toward a side that is affected by the reflected light from the structure.

In the present embodiment, the storage unit may store a third lookup table as the plurality of lookup tables. The third lookup table may be associated with the third light source element provided at the third position different from the first position and the second position of the backlight, and may indicate a third attenuation rate distribution of the third light source element. The second position may be a position that is closer to the first side of the display panel than is the first position. The third position may be a position that is closer to the first corner portion, at which the second side and the third side of the display panel intersect with each other, than is the first position. The luminance information calculation circuit may obtain the third attenuation rate of the light reaching the target pixel from the third light source element based on the third lookup table, and may calculate the luminance information based on the first attenuation rate, the second attenuation rate, and the third attenuation rate.

According to the present embodiment, the first to third lookup tables are associated with the first to third light source elements provided at the different first to third positions. Accordingly, since a lookup table having a different attenuation rate distribution according to a position of a light source element can be applied, a luminance of light reaching each pixel from the backlight can be accurately obtained in consideration of the difference in a diffusion pattern of the light according to the position of the light source element.

The circuit device according to the present embodiment may include a luminance analysis circuit and a color correction circuit. The luminance analysis circuit may perform luminance analysis on image data, and may obtain dimming information in local dimming control based on the result of the luminance analysis. The luminance information calculation circuit may obtain a first luminance of the light reaching the target pixel from the first light source element based on the dimming information and the first attenuation rate, may obtain a second luminance of the light reaching the target pixel from the second light source element based on the dimming information and the second attenuation rate, and may calculate the luminance information based on the first luminance and the second luminance. The color correction circuit may perform color correction on the image data of the target pixel based on the luminance information, and output the image data after the color correction to the display device.

According to the present embodiment, in consideration of the difference in the diffusion pattern of the light according to the position of the light source element, the first luminance of the light reaching the target pixel from the first light source element and the second luminance of the light reaching the target pixel from the second light source element are accurately obtained. Accordingly, since the luminance information indicating the luminance of the light reaching the target pixel from the backlight is accurately obtained, the color correction circuit can appropriately correct the color of the image data of the target pixel based on the luminance information.

The display system according to the present embodiment includes any one of the circuit devices and the display device described above.

Although the embodiment has been described in detail as described above, it can be readily apparent to those skilled in the art that many modifications may be made without departing substantially from novel matters and effects of the present disclosure. Therefore, all such modifications are intended to be included in the scope of the present disclosure. For example, a term cited with a different term having a broader meaning or the same meaning at least once in the description or in the drawings can be replaced with the different term at any place in the description or in the drawings. In addition, all combinations of the embodiment and the modifications are also included in the scope of the present disclosure. Configurations, operations, and the like of the circuit device, the backlight, the display device, the display system, the processing device, the electronic device, and the like are not limited to those described in the present embodiment, and various modifications can be made.

What is claimed is:

1. A circuit device comprising:

a storage unit configured to store a plurality of lookup tables each indicating an attenuation rate distribution of a light source element of a backlight of a display device including a display panel and the backlight; and a luminance information calculation circuit configured to calculate luminance information indicating a luminance of light reaching a target pixel of the display panel from the backlight, wherein the storage unit is configured to store, as the plurality of lookup tables, a first lookup table that is associated with a first light source element provided at a first position of the backlight and that indicates a first attenuation rate distribution of the first light source element, and a second lookup table that is associated with a second light source element provided at a second position different from the first position of the backlight and that indicates a second attenuation rate distribution of the second light source element, and the luminance information calculation circuit is configured to obtain a first attenuation rate of light reaching the target pixel from the first light source element based on the first lookup table, obtain a second attenuation rate of light reaching the target pixel from the second light source element based on the second lookup table, and calculate the luminance information based on the first attenuation rate and the second attenuation rate.

2. The circuit device according to claim 1, wherein each of the lookup tables is a table in which an attenuation rate at a distance, from a light source element to a pixel of the display panel, is associated with the distance, and the luminance information calculation circuit is configured to obtain the first attenuation rate at a distance from the first light source element to the target pixel based on the first lookup table, and obtain the second attenuation rate at a distance from the second light source element to the target pixel based on the second lookup table.

3. The circuit device according to claim 1, wherein the second position is a position that is closer to a first side of the display panel than is the first position.

4. The circuit device according to claim 3, wherein the backlight includes a third light source element provided at a third position that is closer to a third side facing the first side of the display panel than is the first position, and the luminance information calculation circuit is configured to calculate a third attenuation rate of light reaching the target pixel from the third light source element based on a lookup table obtained by rotating the second lookup table by 180°, and calculate the luminance information based on the first attenuation rate, the second attenuation rate, and the third attenuation rate.

5. The circuit device according to claim 1, wherein the second position is a position that is closer to a first corner portion, at which a first side and a second side of the display panel intersect with each other, than is the first position.

6. The circuit device according to claim 5, wherein the backlight includes a third light source element provided at a third position that is closer to a second corner portion, at which a third side facing the first side of the display panel and a fourth side facing the second side of the display panel intersect with each other, than is the first position, and the luminance information calculation circuit is configured to calculate a third attenuation rate of light reaching the target pixel from the third light source element based on a lookup table obtained by rotating the second lookup table by 180°, and calculate the luminance information based on the first attenuation rate, the second attenuation rate, and the third attenuation rate.

7. The circuit device according to claim 1, wherein the first attenuation rate distribution is an attenuation rate distribution rotationally symmetric with respect to a center thereof, and the second attenuation rate distribution is an attenuation rate distribution non-rotationally symmetric with respect to a center thereof.

8. The circuit device according to claim 7, wherein in the second attenuation rate distribution, an attenuation characteristic in a direction from the center toward one side of the display panel and an attenuation characteristic in a direction from the center toward a side different from the one side of the display panel are different from each other.

9. The circuit device according to claim 1, wherein the storage unit stores, as the plurality of lookup tables, a third lookup table that is associated with a third light source element provided at a third position different from the first position and the second position of the backlight and that indicates a third attenuation rate distribution of the third light source element, the second position is a position that is closer to a first side of the display panel than is the first position, the third position is a position that is closer to a first corner portion, at which a second side and a third side of the display panel intersect with each other, than is the first position, and the luminance information calculation circuit is configured to obtain a third attenuation rate of light reaching the target pixel from the third light source element based on the third lookup table, and calculate the luminance information based on the first attenuation rate, the second attenuation rate, and the third attenuation rate.

10. The circuit device according to claim 1, further comprising:

a luminance analysis circuit; and a color correction circuit, wherein the luminance analysis circuit is configured to perform luminance analysis on image data and obtain dimming information in local dimming control of the backlight based on a result of the luminance analysis, the luminance information calculation circuit is configured to obtain a first luminance of the light reaching the target pixel from the first light source element based on the dimming information and the first attenuation rate, obtain a second luminance of the light reaching the target pixel from the second light source element based on the dimming information and the second attenuation rate, and calculate the luminance information based on the first luminance and the second luminance, the color correction circuit is configured to perform color correction on image data of the target pixel based on the luminance information, and output image data after the color correction to the display device.

11. A display system comprising:

the circuit device according to claim 1; and the display device.

12. The circuit device according to claim 1, wherein each of the first and second lookup tables is a two-dimensional lookup table.

* * * * *